United States Patent
Gaw

(10) Patent No.: US 10,457,189 B1
(45) Date of Patent: Oct. 29, 2019

(54) EXPANDABLE COMPACT CAMPING TRAILER

(71) Applicant: Gerald Lloyd Gaw, Spokane, WA (US)

(72) Inventor: Gerald Lloyd Gaw, Spokane, WA (US)

(*) Notice: Subject to any disclaimer, the term of this patent is extended or adjusted under 35 U.S.C. 154(b) by 0 days.

(21) Appl. No.: 16/018,548

(22) Filed: Jun. 26, 2018

Related U.S. Application Data

(60) Provisional application No. 62/556,843, filed on Sep. 11, 2017.

(51) Int. Cl.
| | |
|---|---|
| *B60P 3/34* | (2006.01) |
| *F24C 15/30* | (2006.01) |
| *B60P 3/36* | (2006.01) |
| *B60P 3/39* | (2006.01) |

(52) U.S. Cl.
CPC .............. *B60P 3/34* (2013.01); *B60P 3/36* (2013.01); *F24C 15/30* (2013.01); *B60P 3/39* (2013.01); *B60Y 2200/147* (2013.01)

(58) Field of Classification Search
CPC .. B60P 3/34; B60P 3/36; B62D 63/031; F24C 15/30
USPC ........................................ 296/165, 171, 173
See application file for complete search history.

(56) References Cited

U.S. PATENT DOCUMENTS

| | | | | |
|---|---|---|---|---|
| 2,457,581 | A * | 12/1948 | McCain | B60P 3/34 296/171 |
| 5,192,111 | A * | 3/1993 | Hanemaayer | B60P 3/343 135/88.1 |
| 5,263,467 | A * | 11/1993 | Jones | A47J 37/0713 126/37 B |
| 5,586,546 | A * | 12/1996 | Ashcraft | B60P 3/36 126/37 B |
| 5,658,032 | A * | 8/1997 | Gardner | B60P 3/34 296/175 |
| 6,263,867 | B1 * | 7/2001 | Skelton | B60R 9/02 126/25 R |
| 6,302,475 | B1 * | 10/2001 | Anderson | B60P 3/34 296/175 |
| 10,214,131 | B2 * | 2/2019 | Aplin | B60P 3/36 |

* cited by examiner

*Primary Examiner* — Jason S Daniels
(74) *Attorney, Agent, or Firm* — Plager Schack LLP; Mark H. Plager; Kara Verryt

(57) ABSTRACT

An expandable compact camping trailer may include a trailer body having a base with wheels and a trailer hitch connection attached thereto, walls extending upward from the base, a door with a doorframe built into at least one of the walls, and a roof closing a top of the trailer body; an expandable module built into at least one of the walls of the trailer body, wherein when the expandable module is slid into an interior of the trailer body, the expandable module is positioned within a top half of a portion of the trailer body; and a pivotable stove attached to a range pivot cylinder built into the doorframe. The pivotable stove may be designed to pivot from a first position entirely within the trailer body to a second position entirely outside of the trailer body.

10 Claims, 5 Drawing Sheets

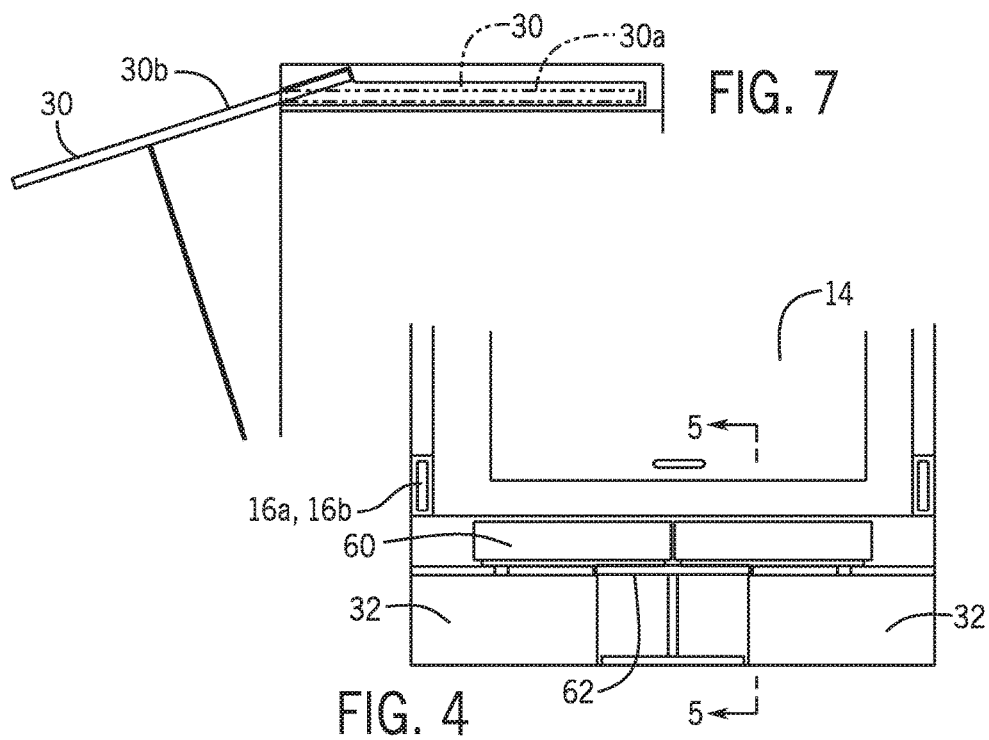
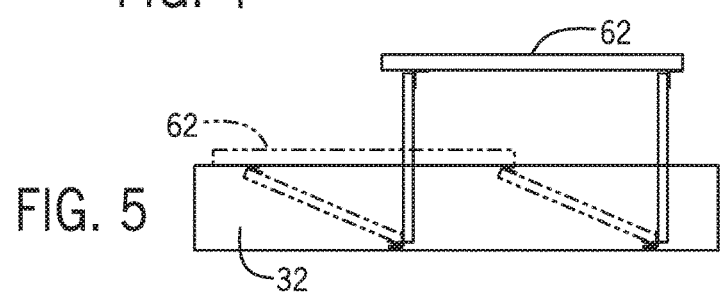
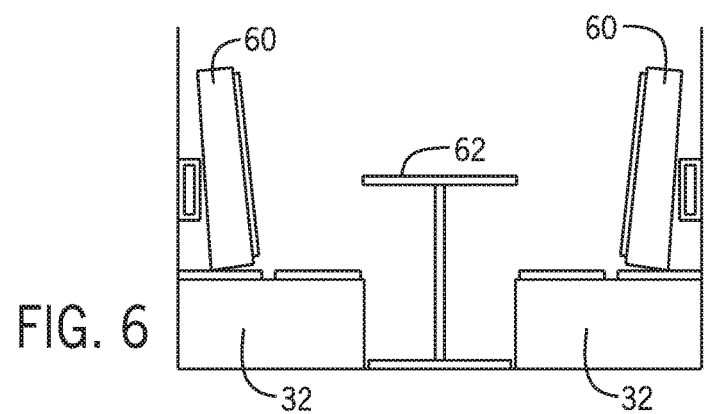

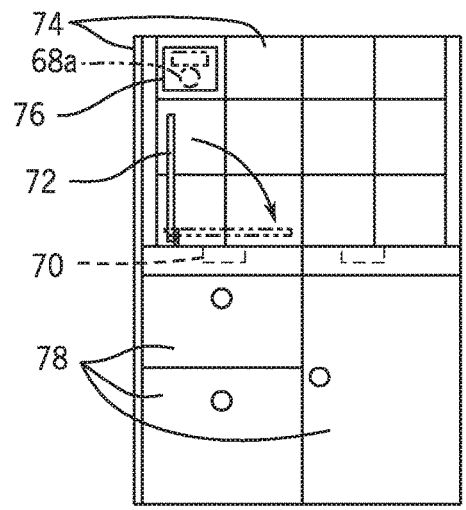
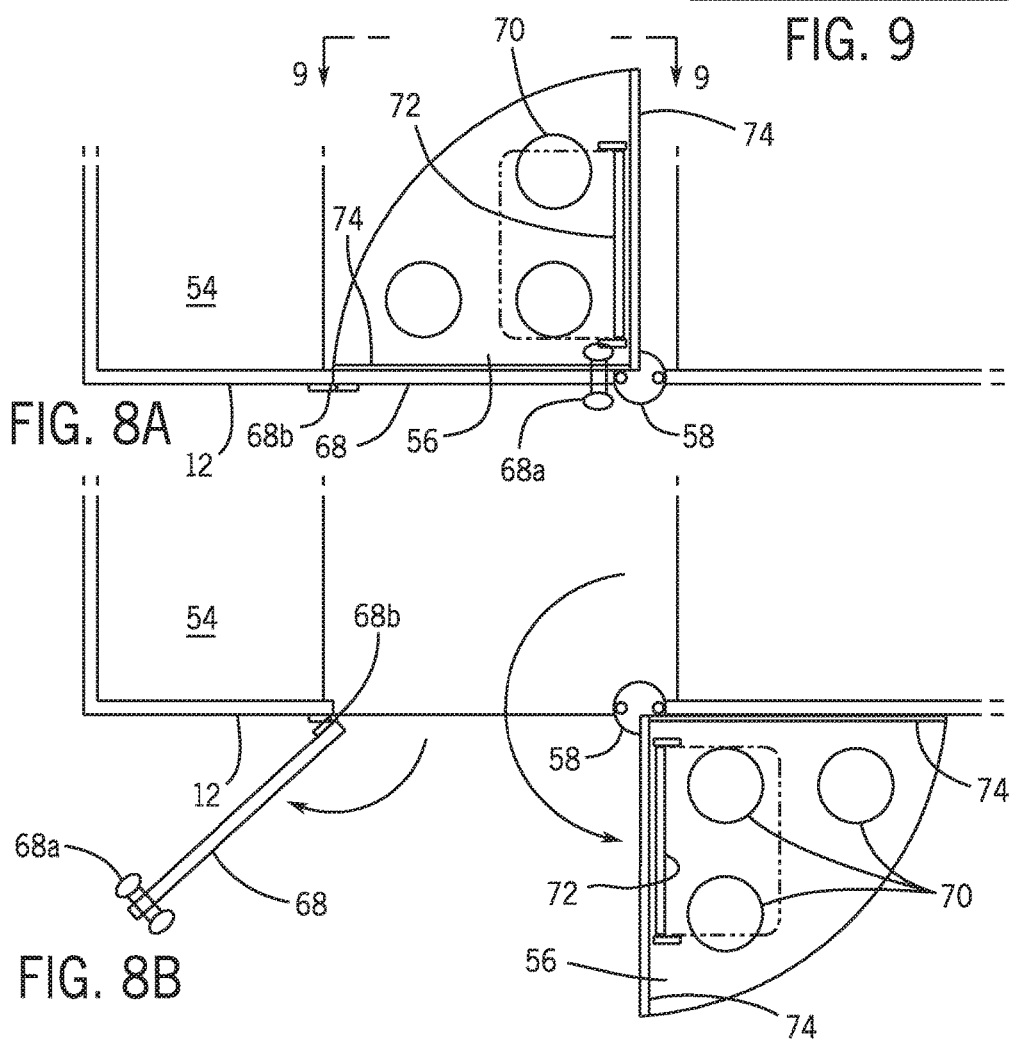

US 10,457,189 B1

EXPANDABLE COMPACT CAMPING TRAILER

RELATED APPLICATION

This application claims priority to provisional patent application U.S. Ser. No. 62/556,843 filed on Sep. 11, 2017, the entire contents of which is herein incorporated by reference.

BACKGROUND

The embodiments described herein relate generally to trailers, and more particularly, to an expandable compact camping trailer.

Trailer units for camping and touring are often large and unwieldy. Compact units usually lack basic conveniences and necessities, such as showers and toilets. Moreover, compact units most often have sleeping room for only two adults and, possibly, two children. Additionally, water often needs to be carried in, in separate containers, and use of portable chemical toilets tends to be cumbersome.

Some compact trailer units include fold up tents and roll up canopies, which are subject to deterioration from the elements and mildew. Fold up units also tend to be complicated and have considerably lengths of adjoining pieces to seal.

Among other issues, cooking in the cramped confines of compact trailers can be troublesome, and cooking odors tend to linger.

Therefore, what is needed is an expandable compact camping trailer with improved and larger sleeping areas, a weather resistant construction, and basic necessities

SUMMARY

Some embodiments of the present disclosure include an expandable compact camping trailer. The expandable compact camping trailer may include a trailer body having a base with wheels and a trailer hitch connection attached thereto, walls extending upward from the base, a door with a doorframe built into at least one of the walls, and a roof closing a top of the trailer body; an expandable module built into at least one of the walls of the trailer body, wherein when the expandable module is slid into an interior of the trailer body, the expandable module is positioned within a top half of a portion of the trailer body; and a pivotable stove attached to a range pivot cylinder built into the doorframe. The pivotable stove may be designed to pivot from a first position entirely within the trailer body to a second position entirely outside of the trailer body.

BRIEF DESCRIPTION OF THE FIGURES

The detailed description of some embodiments of the invention is made below with reference to the accompanying figures, wherein like numerals represent corresponding parts of the figures.

FIG. 4 is a cross-sectional view of one embodiment of the present disclosure, taken along line 4-4 in FIG. 3.

FIG. 5 is a cross-sectional view of one embodiment of the present disclosure, taken along line 5-5 in FIG. 4.

FIG. 6 is a cross-sectional view of one embodiment of the present disclosure, similar to FIG. 4.

FIG. 7 is a cross-sectional view of one embodiment of the present disclosure, taken along line 7-7 in FIG. 2.

FIG. 8A is a top plan view of one embodiment of the present disclosure, showing the stove in a travel position.

FIG. 8B is a top plan view of one embodiment of the present disclosure, showing the stove in an in-use position.

FIG. 9 is an elevation view indicated by line 9-9 in FIG. 8A.

DETAILED DESCRIPTION OF CERTAIN EMBODIMENTS

Figure 1:
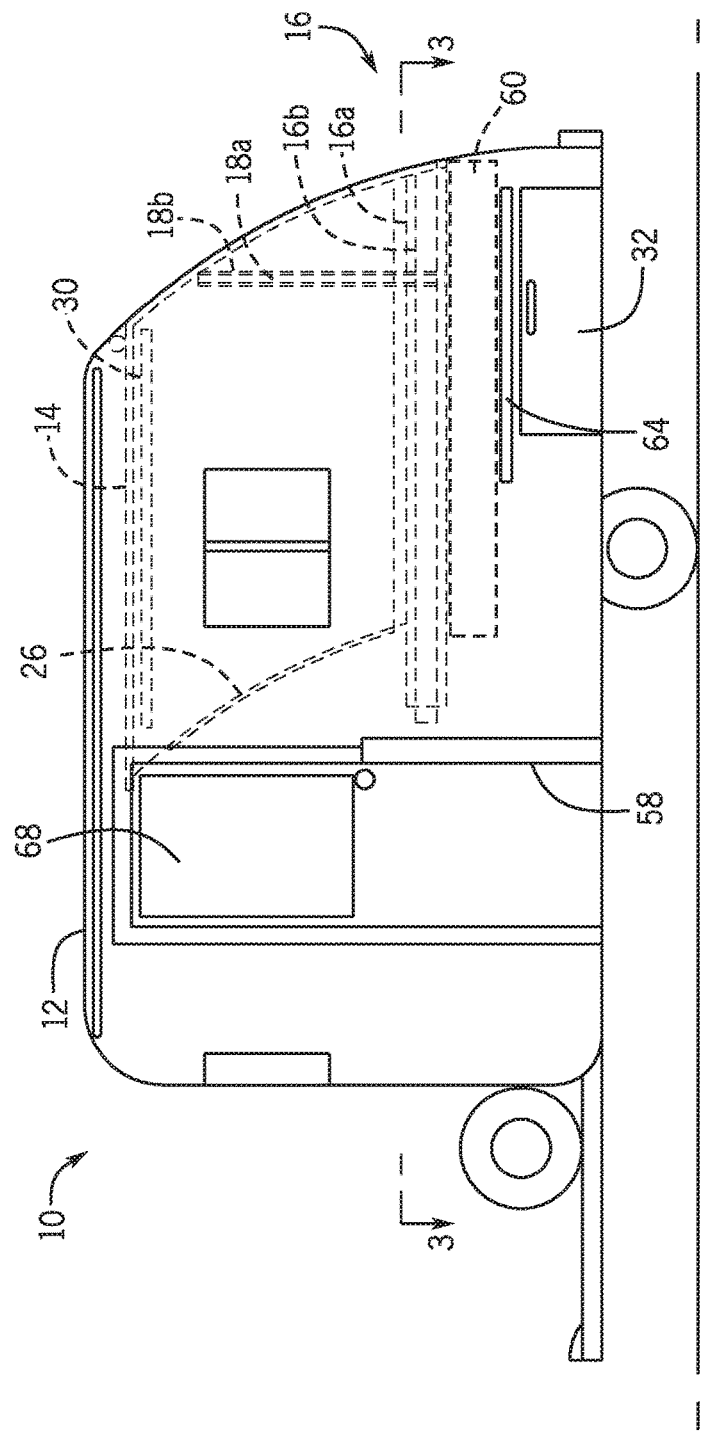
FIG. 1 is a side elevation view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an expandable camping trailer and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Trailer Body
2. Expandable Module
3. Pivotable Stove

The various elements of the device of the present disclosure may be related in the following exemplary fashion. It is not intended to limit the scope or nature of the relationships between the various elements and the following examples are presented as illustrative examples only.

By way of example, and referring to FIGS. 1-9, some embodiments of the present disclosure include an expandable compact camping trailer 10 comprising a trailer body 12 comprising a base with wheels and a trailer hitch connection attached thereto, walls extending upward from the base, and a roof closing a top of the trailer body 12; and an expandable module built into at least one of the walls, wherein when the expandable module 14 is slid into an interior of the trailer body, it is positioned within a top half of a portion of the trailer body. In a particular embodiment, and as shown in the Figures, the expandable module 14 may slide in and out of an end of the trailer body 12 opposite the trailer hitch attachment.

The expandable module 14 may be slidably attached to the trailer body 12 by rollout hardware 16. As shown in, for example, FIG. 2, the rollout hardware 16 may comprise internal rollout components 16b attached to an interior of the trailer body 12 and external rollout components 16a attached to an exterior of the expandable module 14, wherein the external roll out components 16a are designed to slide into the internal rollout components 16b. The individual rollout components 16a, 16b may each comprise any suitable track or device designed to slidably engage with one another. As shown in FIG. 6, the roll out components 16 may be positioned along an interior wall of the trailer body 12 such that, when the booth/bed assembly (described in more detail below) is in the seating configuration, the cushions 60 may hide the roll out components 16.

Figure 2:
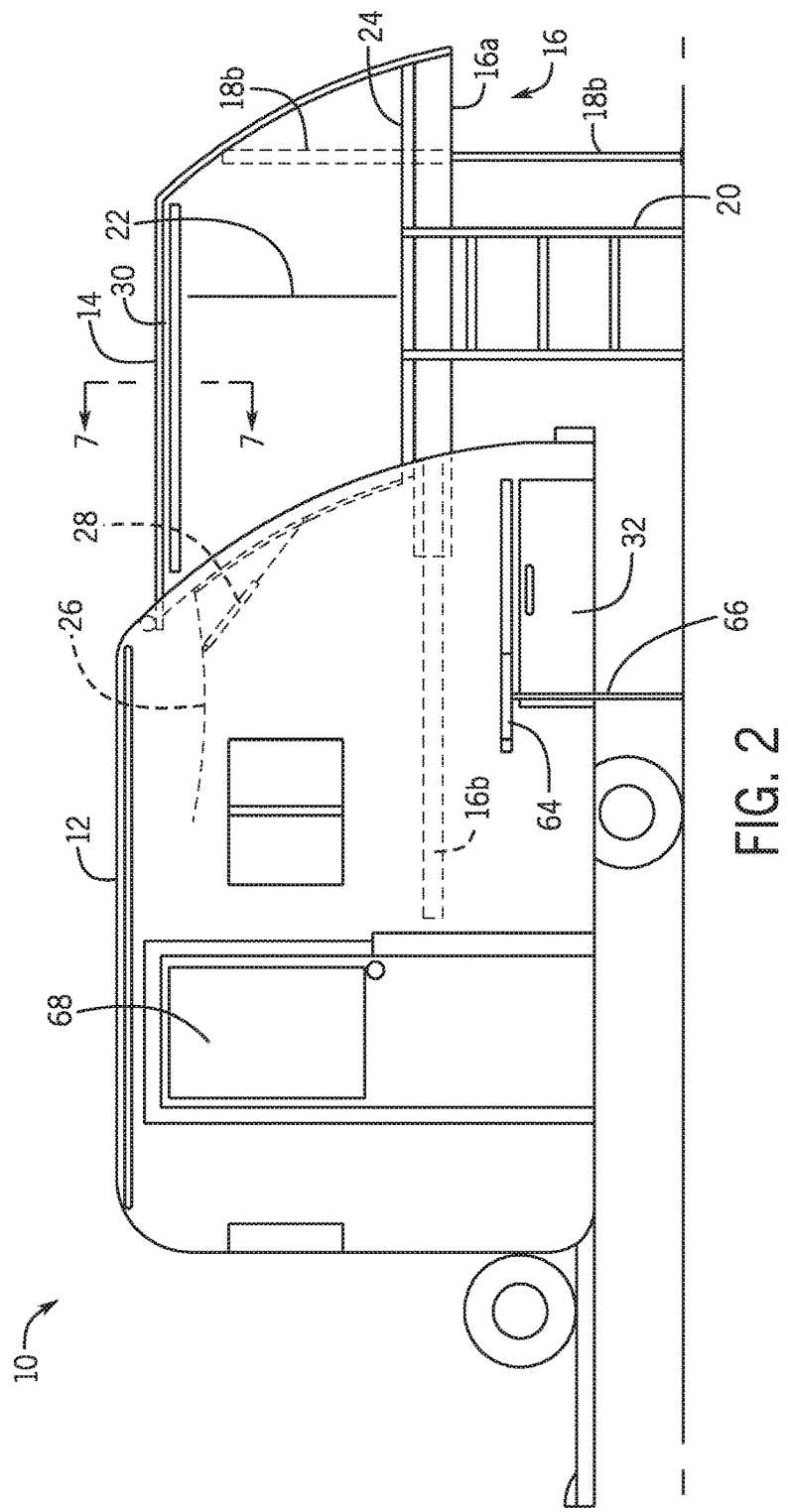
FIG. 2 is a side elevation view of one embodiment of the present disclosure.

When the expandable module 14 is in its expanded position, as shown in FIG. 2, at least one support leg 18a, such as a pair of support legs 18a, may extend downward from the expandable module 14 to provide extra support. When the expandable module 14 is in its storage position, as shown in FIG. 1, the support leg 18a may be stored within a support leg storage tube 18b in the expandable module. Thus, the support legs 18a may be extractable support legs 18a.

As shown in FIG. 2, the expandable module 14 may also include an access ladder 20 engaged therewith. For example, a side surface of the expandable module may comprise an entryway, such as an access slot 22, and the access ladder 20 may be positioned along the side of the expandable module 14 to align with the access slot 22 to provide a user with an easy way of entering the expandable module 14 through the access slot 22. In some embodiments, the side surfaces (i.e., the walls of the expandable module 14) may comprise fabric, such as a fabric that is not subject to mildew. The fabric side walls may hang freely and dry naturally in the open air. Moreover, the side walls may comprise fold up or roll up fabric components.

The expandable module 14 may also include a lift gate 26 with a lift gate support arm 28, wherein the lift gate 26 is built into an end of the expandable module closest to the interior of the trailer body 12 when the expandable module 14 is in its expanded position. The lift gate 26 may allow the expandable module 14 to be closed off or open to the interior of the trailer body 12, as desired.

The expandable module 14 may be designed to provide additional room within the trailer 10. For example, in some embodiments, the expandable module 14 may be a sleeping module and provide additional sleep space for uses. In such cases, the expandable modules may comprise a cushion or bed 24 built into the floor thereof.

Both the trailer body 12 and the expandable module 14 may include a slide out canopy 30 built into a top area thereof. The canopies 30 may be slid out from a storage position 30a to an in-use position 30b, as desired and as shown in FIG. 7, to provide a covered area outside of the trailer 10.

The expandable compact trailer 10 may further comprise a combined booth/bed assembly positioned within an interior of the trailer body 12 such that, when the expandable module 14 is slid into the interior of the trailer body 12, the combined booth/bed assembly is horizontally below the expandable module 14. As shown in, for example, FIG. 6, the combined booth/bed assembly may comprise a table 62 positioned between a pair of benches, wherein the booth configuration may be used for eating or other indoor activities. The pair of benches may be defined by a slide out storage container 32 functioning as a sitting surface and a foldable cushion 60 function as either a back rest when the expansion module 12 is slid out of the trailer body 12, as shown in FIG. 6, or as a bed when folded down, as shown in FIG. 4. As shown in FIG. 5, to allow the cushion 60 to fold down into a bed or storage position, the table 62 may swing downwards. The cushion 60 may also be folded down to allow for the expansion module 14 sliding into the trailer body 12.

In particular, the cushions 60 may each comprise a separate twin mattress sized cushion that, when fold down, abut lengthwise and may be enclosed on the nonabutting sides by a three sided bedframe that may be attached lengthwise to a top of the slide out storage compartment 32 with hinges. To covert to the sitting or booth configuration, each bed frame may be lifted up and back from the center of the adjoining twin mattress to a lengthwise upright position. The bottoms of the bedframes may then face toward the center, may be padded, and may be the backrests for the booth/sitting configuration. The tops of the slide out storage compartments 32, which may be padded, function as the bench seats.

Figure 3:
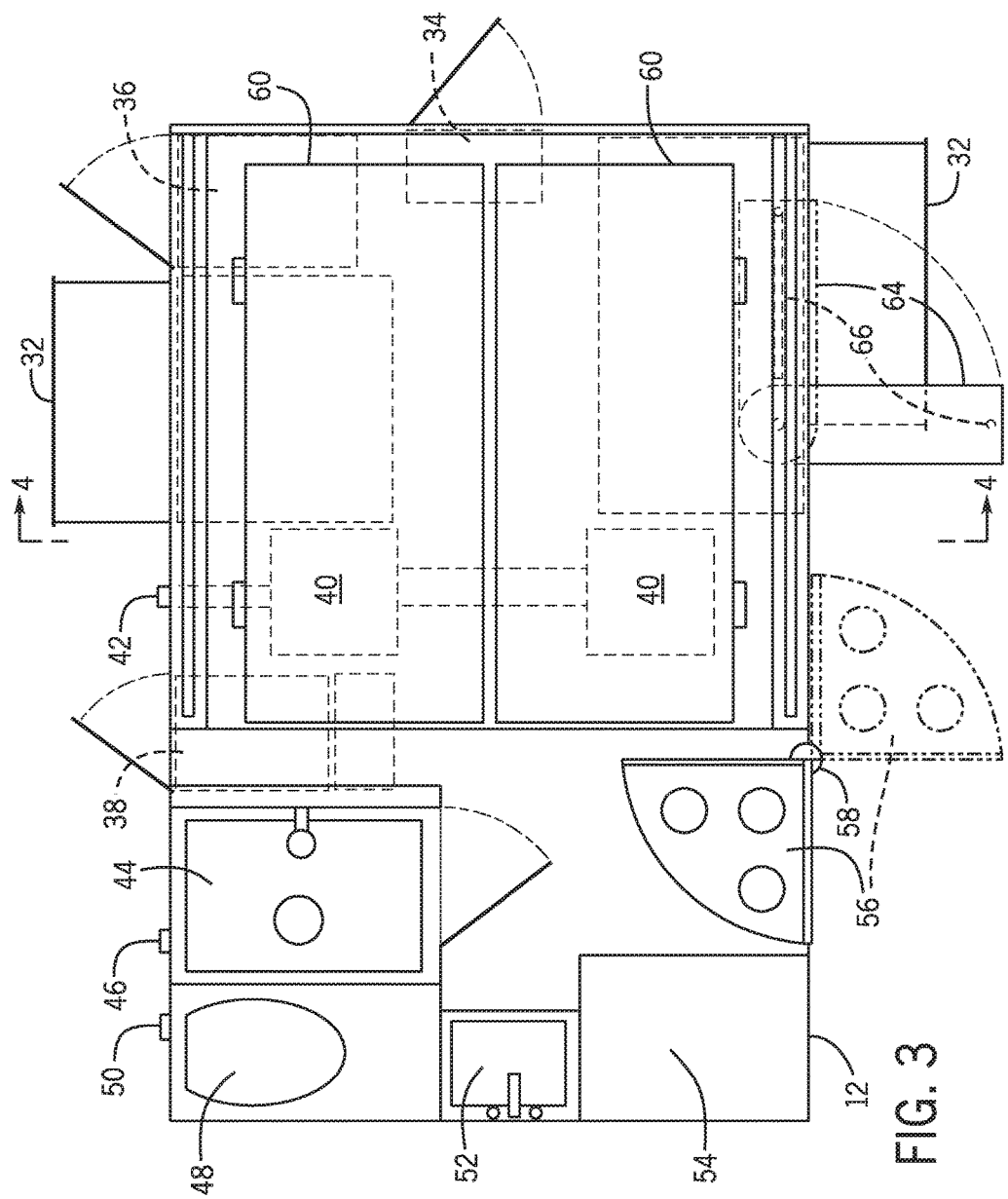
FIG. 3 is a floor plan view of one embodiment of the present disclosure.

The interior of the trailer body 12 may also include other necessities and amenities. A door 68 may provide an entry way into the interior of the body 12. A utility and bathroom area may be positioned proximate to the door 68 and proximate to an end of the trailer body 12 distal from the expansion module 14. The utility and bathroom area may include a stove 56, a refrigerator 54, a sink 52, a toilet 48, such as a chemical toilet, and a shower stall 44. The refrigerator 54 may comprise a side-by-side, under the counter RV refrigerator; however, the use of other refrigerators is also envisioned. The sink 52 and the shower stall 44 may be operatively attached to a water heater 38 stored within a storage compartment. The water heater 38 may be operatively attached to a water storage tank 40. In some embodiments, the trailer 10 may comprise multiple water storage tanks 40, as shown in FIG. 3. The water storage tanks 40 may be attached to a fill pipe 40 that extends from an exterior of the trailer body 12. The toilet 48 may have a black water discharge 50 extending therefrom and to an exterior of the trailer body 12. Similarly, the shower stall 44 and sink 46 may be attached to a gray water discharge pipe 46 extending to an exterior of the trailer body 12.

In a particular body, the stove 56 may be a swing out stove designed to pivot out of the door opening when the door 68 is open and to a position on the exterior of the trailer body 12. As shown in FIG. 3, the stove 56 may be attached to a range pivot cylinder 58 that allows the stove 56 to pivot from a first position entirely within the trailer body 12 to a second position entirely outside of the trailer body 12. As shown in FIGS. 8A and 8B, the range pivot cylinder 58 may be positioned at an edge of the doorway opposite the hinge 68b that attaches the door 68 to the trailer body 12. The doorknob 68a may be positioned opposite the hinge 68b and, when the door 68 is shut, the door knob 68a may be adjacent to the range pivot cylinder 58. Not only does the pivoting stove allow for outdoor cooking, but it also frees up space within the interior of the trailer body 12. The stove 56 may also be used for cooking when positioned within the trailer body 12, if needed or desired.

The range pivot cylinder 58 may include axis pins that are designed to engage with pin slots in the door frame. The axis pins may be compressed to disengage with the pin slots, allowing the pivot cylinder 58 to pivot. The axis pins may then engage with the pin slots again to lock into place.

While other configurations are envisioned, in some embodiments, the stove 56 comprises a cooking surface with a plurality of burners 70 within an open cage 74 apparatus that may be raised and lowered for a desired height and a grill 72 positioned over at least two of the burners 70 and that folds up out of the way when not in use. The cage 74 may include an access opening 76 to provide access to the doorknob 68a. Moreover, storage cabinets 78 may be positioned vertically below the cooking surface. As shown in the Figures, the cooking surface may be arc shaped, such as shaped like ¼ of a circle. However, other sizes and shapes are envisioned.

In some embodiments, a swing out table 64 with a fold down leg 66 may be built into an exterior of the trailer body 10, thus allowing for a sitting or eating area outside of the trailer 10 and, if desired, under an extended canopy 30. The trailer body 10 may also include a battery compartment 34 and a compact generator compartment 36.

The outer dimensions of the trailer 10 may enable it to fit into sites often too small for most conventional trailers. Its reduced size may also make it more maneuverable than most trailers. Because of the expandable module 14, the compact trailer 10 may provide sleeping areas for more individuals than a conventional compact trailer.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An expandable compact camping trailer comprising:
   a trailer body comprising a base with wheels and a trailer hitch connection attached thereto, walls extending upward from the base, an entry way door with a doorframe built into at least one of the walls, and a roof closing a top of the trailer body defining an interior of the trailer body;
   an expandable module built into at least one of the walls of the trailer body, wherein when the expandable module is slid into the interior of the trailer body, the expandable module is positioned within a top half of a portion of the trailer body; and
   a pivotable stove attached to a range pivot cylinder built into the doorframe,
   wherein the pivotable stove is designed to pivot from a first position entirely within the trailer body to a second position entirely outside of the trailer body.

2. The expandable compact camping trailer of claim 1, wherein the expandable module slides in and out of an end of the trailer body opposite the trailer hitch attachment.

3. The expandable compact camping trailer of claim 2, wherein the expandable module comprises roll out hardware comprising internal components attached to an interior surface of the trailer body and exterior components attached to an exterior surface of the expandable module, the internal components designed to slidably engage with the external components.

4. The expandable compact camping trailer of claim 2, further comprising:
   a support leg attached to the expandable module; and
   a support leg storage tube built into the expandable module the support leg storage tube sized to accommodate the support leg when not in use.

5. The expandable compact camping trailer of claim 2, further comprising:
   an access slot in a wall of the expandable module; and
   an access ladder engaged with the expandable module and aligned with the access slot.

6. The expandable compact camping trailer of claim 1, wherein the expandable module is a sleeping module comprising a bed built into a floor thereof.

7. The expandable compact camping trailer of claim 1, wherein the pivotable stove comprises:
   a cooking surface attached to a top surface of a storage cabinet; and
   an open cage surrounding the cooking surface.

8. The expandable compact camping trailer of claim 1, wherein:
   the pivotable stove is arc shaped;
   the range pivot cylinder is attached to the pivotable stove at a vertex thereof.

9. The expandable compact camping trailer of claim 1, further comprising:
   a first slide out canopy built into a top region of the trailer body; and
   a second slide out canopy built into a top region of the expandable module.

10. The expandable compact camping trailer of claim 1, further comprising a convertible booth/bed assembly positioned vertically below the expandable module when the expandable module is in an unexpanded position.

* * * * *